W. B. BARNARD, Dec'd.

A. J. BARNARD, Executor, Assignor to the STAR TOOL CO.

BLIND AND SHUTTER FASTENINGS.

Reissued Nov. 28, 1876.

No. 7,409.

Witnesses.

Wendell R. Curtis.

John F. Peters

Inventor.

Tom B. Barnard assignor to the Star Tool Co.

J. Thos. G. Ellis, Attorney

THE GRAPHIC CO. N.Y.

UNITED STATES PATENT OFFICE.

THE STAR TOOL COMPANY, OF MIDDLETOWN, CONNECTICUT, ASSIGNEES OF A. J. BARNARD, EXECUTOR OF W. B. BARNARD, DECEASED.

IMPROVEMENT IN BLIND AND SHUTTER FASTENINGS.

Specification forming part of Letters Patent No. 36,597, dated October 7, 1862; reissue No. 7,409, dated November 28, 1876; application filed January 29, 1876.

*To all whom it may concern:*

Be it known that W. B. BARNARD, of Waterbury, in the county of New Haven and State of Connecticut, did invent a new and useful Improvement in Blind and Shutter Fastenings for Windows; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1:
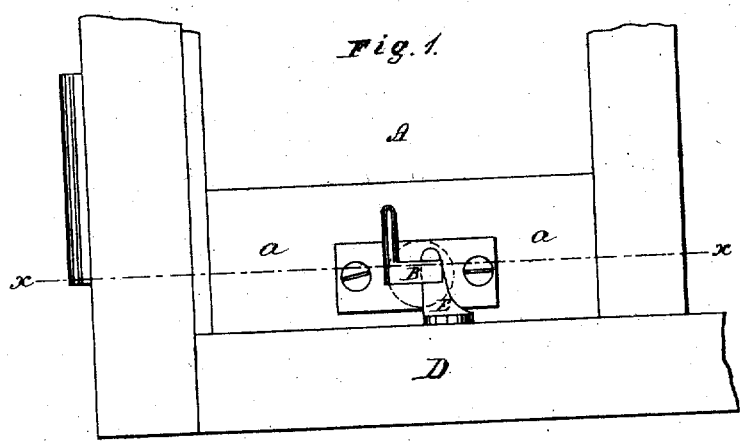
Figure 2:
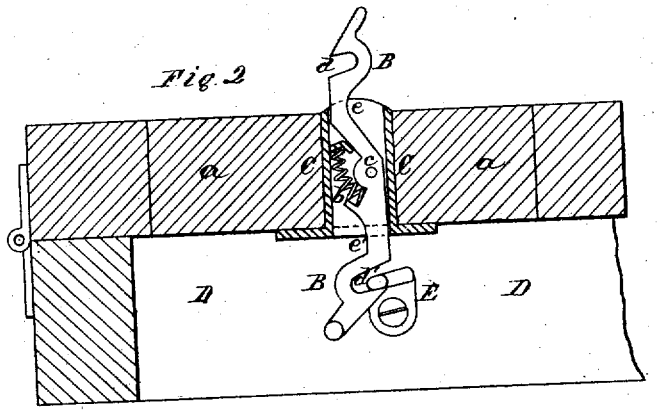
Figure 3:
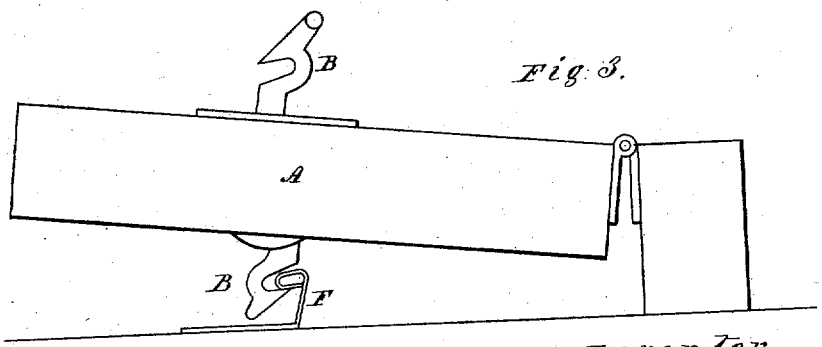

Figure 1 is an inside view of a window-blind with this invention applied to it. Fig. 2 is a horizontal section of the same, taken on the line *x x* of Fig. 1. Fig. 3 is a top view, showing the blind open.

The object of this invention is to obtain a fastening for shutters and blinds of simple construction, which will prevent the movement and rattling of the same, when either open or closed, under the action of the wind.

This invention consists in making the studs or pins, which are attached to the window-sill or to the side of the building, and on which the catch of the blind or shutter fits, of a taper or wedge shape in their horizontal section, and making the recess in the catch of corresponding taper form, so that when latched it will fit snugly thereto, and effect the desired result. It also consists in the mechanism by which the catch is given sufficient play to allow the pin to fully enter the recess without projecting beyond the socket.

A represents a blind or shutter, constructed and applied to a window in the usual manner. B is a spring-catch, which is fitted in a tube or socket, C, placed transversely in the lower cross-rail *a* of the blind or shutter. It has a spring, *b*, bearing against it, as shown in Fig. 2, and turns on a pivot, *c*, in the tube or socket C. The pivot *c* is placed to one side, within the socket, as shown in the drawing, to make room for the spring *b*, and the catch is provided with the recesses *e e'*, to give it sufficient lateral motion. The catch B extends outward some distance from each end of the socket, and near each end there is a recess, *d d'*, of taper form, as shown in the drawing, the recesses being in opposite sides of the catch.

The ends of the catch containing the recesses *d d'* extend back over the recesses *e e'*, so that when the catch rests against the sides of the socket C, under the influence of the spring *b*, no part of the exterior end projects laterally beyond the circumference of the socket. This permits the fastening to be inserted into a circular hole in the blind or shutter without interference from the exterior end of the catch. In the sill D of the window-frame there is secured a stud or pin, E, which is of taper or wedge form, corresponding to the recesses *d d'*, and to the side of the building there is secured a projection, F, provided with a stud or pin of similar form. This projection may be cast in the desired shape, or it may be formed by bending up a metal plate to make a wedge-shaped lip, as shown in Fig. 3.

From the foregoing description it will be seen that when the blind or shutter is closed the recess *d'* fits on the stud E, and is held by the spring *b*, so that, in consequence of its taper form, all play of the blind or shutter is prevented. The same is true of the recess *d*, which fits on the projection F, and is likewise pressed into position by the spring *b*. Thus the blind or shutter is held perfectly tight when either open or closed, so as to prevent all play, and consequent rattle, under the action of the wind.

By means of this invention also all wear of the several parts is compensated, as the spring *b* will cause the recesses *d d'* to press snugly on the studs or pins, and sufficient play is given to the catch B to allow of the extra movement required.

What is claimed as new, and desired to be secured by Letters Patent, is—

1. The combination of the wedge-shaped studs E F, with the spring-catch B, provided with the taper recesses *d d'*, substantially as and for the purpose herein described.

2. The catch B, with recesses *d* and *e*, in combination with the socket C, constructed and arranged so that the projecting end containing the recess *d* does not project laterally beyond the interior circumference of the socket C when closed, and the recess *e* allows a sufficient lateral movement to open it, substantially as herein shown and described.

JULIUS HOTCHKISS,
*President of The Star Tool Co., Assignees of A. J. Barnard, Executor of Wm. B. Barnard, deceased.*

Witnesses:
E. C. SMITH,
H. W. B. STARR.